(12) United States Patent  (10) Patent No.: US 8,891,900 B2
Conlon (45) Date of Patent: *Nov. 18, 2014

(54) FRAME-BASED COORDINATE SPACE TRANSFORMATIONS OF GRAPHICAL IMAGE DATA IN AN IMAGE PROCESSING SYSTEM

(75) Inventor: Paul Roberts Conlon, South Bristol, NY (US)

(73) Assignee: Xerox Corporation, Norwalk, CT (US)

( * ) Notice: Subject to any disclaimer, the term of this patent is extended or adjusted under 35 U.S.C. 154(b) by 764 days.

This patent is subject to a terminal disclaimer.

(21) Appl. No.: 13/155,756

(22) Filed: Jun. 8, 2011

(65) Prior Publication Data

US 2012/0314229 A1  Dec. 13, 2012

(51) Int. Cl.
*G06K 9/40* (2006.01)
(52) U.S. Cl.
USPC .......................................... 382/276; 358/1.2
(58) Field of Classification Search
CPC ................................................. H04N 1/00347
USPC .............. 382/276; 358/1.2, 1.5, 504; 345/590
See application file for complete search history.

(56) References Cited

U.S. PATENT DOCUMENTS

| 5,204,944 | A * | 4/1993 | Wolberg et al. | 345/427 |
| 8,564,832 | B2 * | 10/2013 | Conlon | 358/1.9 |
| 2003/0053682 | A1 * | 3/2003 | Haikin et al. | 382/162 |
| 2009/0174726 | A1 * | 7/2009 | Ollivier | 345/600 |
| 2010/0156890 | A1 | 6/2010 | Conlon | |
| 2010/0156937 | A1 | 6/2010 | Conlon | |
| 2010/0156940 | A1 | 6/2010 | Fan et al. | |
| 2010/0158411 | A1 | 6/2010 | Conlon | |
| 2011/0109918 | A1 | 5/2011 | Conlon et al. | |
| 2011/0109919 | A1 * | 5/2011 | Conlon et al. | 358/1.2 |
| 2011/0298819 | A1 * | 12/2011 | Evans et al. | 345/589 |
| 2012/0007877 | A1 * | 1/2012 | Butler | 345/589 |
| 2012/0249536 | A1 * | 10/2012 | Sutou | 345/419 |
| 2012/0307264 | A1 * | 12/2012 | Arregui et al. | 358/1.9 |

OTHER PUBLICATIONS

Adobe Systems Incorporated, "TIFF Revision 6.0", Jun. 3, 1992, pp. 1-121, Mountain View, CA.

* cited by examiner

*Primary Examiner* — Samir Ahmed
(74) *Attorney, Agent, or Firm* — Philip E. Blair; Fleit Gibbons Gutman Bongini & Bianco P.L.

(57) ABSTRACT

What is disclosed are a novel system and method for transforming coordinates in an image processing system. In one embodiment, image data is received in a first coordinate space and second coordinate space information is received. A first selection is made, based on a set of relative coordinate space mappings, to select at least a first transformation for mapping of the image data in the first coordinate space to an intermediate image canonical coordinate space using at least a first coordinate change matrix. The intermediate image canonical coordinate space has coordinates which are independent of the image processing system. A second selection is made, based on the set of relative coordinate space mappings, to select at least a second transformation for mapping from the intermediate image canonical coordinate space to the second coordinate space using at least a second coordinate change matrix to transform the intermediate image canonical coordinate space.

18 Claims, 7 Drawing Sheets

| FIGURE | ITEM | 2D GRAPHIC | 2D CCM | 3D GRAPHIC | 3D CCM |
|---|---|---|---|---|---|
| | | | CCM2D00XxYy | | CCM3D00XxYyZz |
| 400 | 402 | | $\begin{bmatrix} 1 & 0 & 0 \\ 0 & 1 & 0 \\ 0 & 0 & 1 \end{bmatrix}$ | | $\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |
| | | | CCM2D01XxYy | | CCM3D01XxYyZz |
| 400 | 404 | | $\begin{bmatrix} -1 & 0 & 0 \\ 0 & 1 & 0 \\ 0 & 0 & 1 \end{bmatrix}$ | | $\begin{bmatrix} -1 & 0 & 0 & 1 \\ 0 & 1 & 0 & 0 \\ 0 & 0 & 1 & 0 \\ 0 & 0 & 0 & 1 \end{bmatrix}$ |
| | | | CCM2D03XxYy | | CCM3D03XxYyZz |
| 400 | 406 | | $\begin{bmatrix} -1 & 0 & 0 \\ 0 & -1 & 0 \\ 0 & 0 & 1 \end{bmatrix}$ | | $\begin{bmatrix} -1 & 0 & 0 & 1 \\ 0 & -1 & 0 & 1 \\ 0 & 0 & 1 & 0 \\ 0 & 0 & 0 & 1 \end{bmatrix}$ |
| | | | CCM2D02XxYy | | CCM3D02XxYyZz |
| 400 | 408 | | $\begin{bmatrix} 1 & 0 & 0 \\ 0 & -1 & 0 \\ 0 & 0 & 1 \end{bmatrix}$ | | $\begin{bmatrix} 1 & 0 & 0 & 0 \\ 0 & -1 & 0 & 1 \\ 0 & 0 & 1 & 0 \\ 0 & 0 & 0 & 1 \end{bmatrix}$ |
| | | | CCM2D00XyYx | | CCM3D00XyYxZz |
| 500 | 502 | | $\begin{bmatrix} 0 & 1 & 0 \\ 1 & 0 & 0 \\ 0 & 0 & 1 \end{bmatrix}$ | | $\begin{bmatrix} 0 & 1 & 0 & 0 \\ 1 & 0 & 0 & 0 \\ 0 & 0 & 1 & 0 \\ 0 & 0 & 0 & 1 \end{bmatrix}$ |
| | | | CCM2D01XyYx | | CCM3D01XyYxZz |
| 500 | 504 | | $\begin{bmatrix} 0 & 1 & 0 \\ -1 & 0 & 0 \\ 0 & 0 & 1 \end{bmatrix}$ | | $\begin{bmatrix} 0 & 1 & 0 & 0 \\ -1 & 0 & 0 & 1 \\ 0 & 0 & 1 & 0 \\ 0 & 0 & 0 & 1 \end{bmatrix}$ |
| | | | CCM2D03XyYx | | CCM3D03XyYxZz |
| 500 | 506 | | $\begin{bmatrix} 0 & -1 & 0 \\ -1 & 0 & 0 \\ 0 & 0 & 1 \end{bmatrix}$ | | $\begin{bmatrix} 0 & -1 & 0 & 1 \\ -1 & 0 & 0 & 1 \\ 0 & 0 & 1 & 0 \\ 0 & 0 & 0 & 1 \end{bmatrix}$ |
| | | | CCM2D02XyYx | | CCM3D02XyYxZz |
| 500 | 508 | | $\begin{bmatrix} 0 & -1 & 0 \\ 1 & 0 & 0 \\ 0 & 0 & 1 \end{bmatrix}$ | | $\begin{bmatrix} 0 & -1 & 0 & 1 \\ 1 & 0 & 0 & 0 \\ 0 & 0 & 1 & 0 \\ 0 & 0 & 0 & 1 \end{bmatrix}$ |

FRAME-BASED COORDINATE SPACE TRANSFORMATIONS OF GRAPHICAL IMAGE DATA IN AN IMAGE PROCESSING SYSTEM

TECHNICAL FIELD

The present invention is directed to systems and methods for imaging operations including device scaling, translation, reflecting, and rotation of frame-based image data across differing coordinate spaces and the emulation thereof in a digital imaging device.

BACKGROUND

Imaging jobs in imaging systems including printers, facsimile machines, and scanners are used to define operations such as scaling, translation, mirroring or reflecting, and rotation. Different imaging devices behave differently. This different behavior many times occurs across imaging devices from the same manufacturer. The order-of-operation scaling, translation, reflecting, and rotation is noncommutative across devices. Stated differently, if the order of a set of transformation changes, the end results are typically different. Frequently, only through an iterative trial and error process, a user will get an imaging job to run as desired. This inconsistent behavior of imaging devices is even more acute with devices from different manufacturers. One example of an imaging device is a multifunction device (MFD). The MFD is an office or light production machine which incorporates the functionality of multiple devices in one. This multiple functionality includes printing, scanning, faxing, viewing and copying. MFDs provide a smaller footprint as well as centralized document management, document distribution and document production in a large-office setting Many times devices or fleets of devices, even from the same manufacturer, often use different origins and coordinate spaces from system to system for images, sheets, and devices including image processors, mechanical, scanning and xerographic sub-systems. Imaging operations such as device scaling, translation, reflection, rotation and edge erase are relative to a coordinate space (in particular to its origin) so behavior can and often will be different across MFD models. Scanners will often have varying origins and scanning directions so saving scanned images may give inconsistent visual image to raster image orientations. Print and Copy/Scan sometimes use different orientations as well, resulting in different results for each path (often unintentionally and undesirable). For example, scaling is relative to origin, so scaling down or up (reduce/enlarge) may result in different image registration or clipping regions. Origins and order of operation are often fixed on a device, not allowing the user to select a different origin (i.e., a particular corner, the center, or an arbitrary point in the imaging frame) or order of operation. MFDs may possibly rotate in either clockwise or counter clockwise directions.

Figure 1:
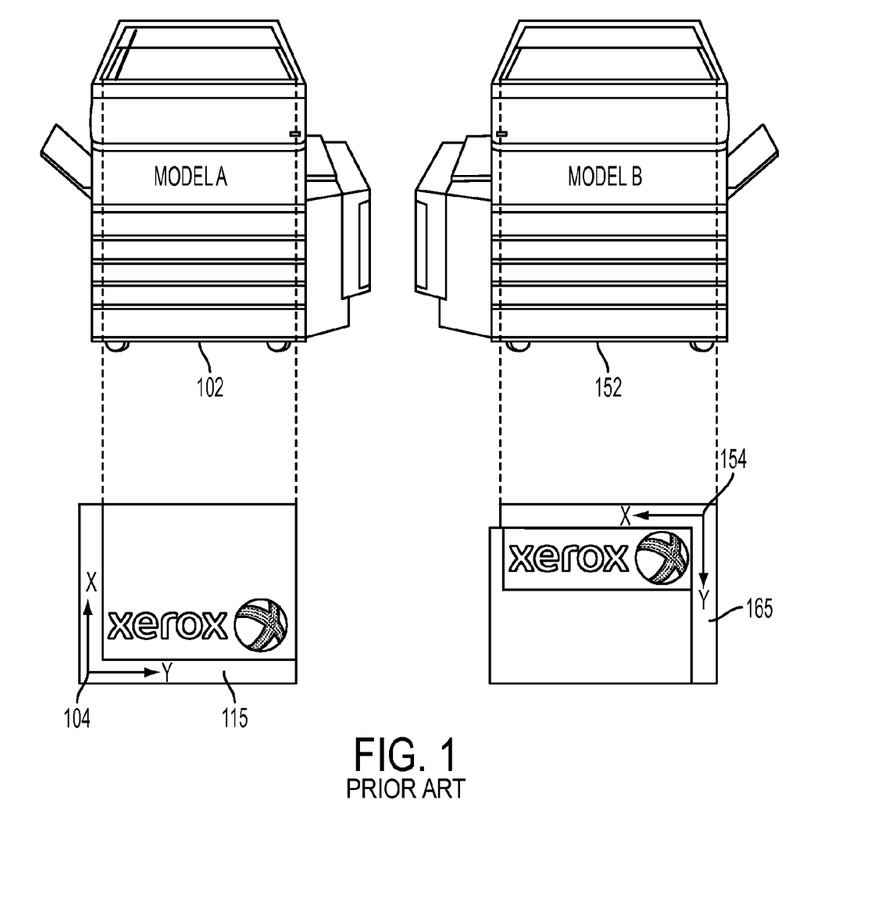
FIG. 1 is a front top perspective view of two model multifunction devices (MFDs) each having different origins and coordinate spaces.

Origins can be further differentiated to be relative to input or output "spaces". More generally these spaces are vector spaces. For most purposes herein the terms "space", "coordinate space" and "vector space" may be used interchangeably. For example, a RIPped or Copy/Scan input origin might be lower right, whereas the user may want to register to an upper left corner of the sheet and perform imaging operations relative to that origin. The challenge is to provide a framework to allow MFDs to conform to a user-definable or selectable set of behaviors. Since a device will typically have a fixed set of capability, algorithms to emulate any desired behavior would give more flexibility to the user, and to allow a suite of varying devices to behave consistently. Behaviors could be defined for a given job, or configured by an administrator as part of a policy used across all jobs. Decoupling user experience from device behavior gives additional flexibility to engineering designs and component choices. FIG. 1 illustrates, by way of example, a front top perspective of two models of MFDs, each with different origins and different coordinate space. Origin 104 is at the lower left corner on platen 115 of a Model A machine. Origin 154 is at the upper right corner on platen 165 of Model B machine. The Xerox Logo is used to easily understand the different coordinate spaces along with their unique origins.

Accordingly, what is needed in this art are increasingly sophisticated systems and methods for transforming coordinates from a first coordinate space to a second coordinate space in an imaging device.

INCORPORATED REFERENCES

The following U.S. patents, U.S. patent applications, and Publications are incorporated herein in their entirety by reference.

"Image Operations Using Frame-Based Coordinate Space Transformations Of Image Data In A Digital Imaging System", by Paul R. Conlon, U.S. patent application Ser. No. 13/155,723, filed concurrently herewith.

"Method And System For Utilizing Transformation Matrices To Process Rasterized Image Data", by Paul R. Conlon, U.S. patent application Ser. No. 12/338,260, filed: Dec. 18, 2008.

"Method And System For Utilizing Transformation Matrices To Process Rasterized Image Data", by Paul R. Conlon, U.S. patent application Ser. No. 12/338,300, filed: Dec. 18, 2008.

"Method And System For Utilizing Transformation Matrices To Process Rasterized Image Data", by Fan et el., U.S. patent application Ser. No. 12/338,318, filed: Dec. 18, 2008.

"Method And System For Utilizing Transformation Matrices To Process Rasterized Image Data", by Fan et el., U.S. patent application Ser. No. 12/339,148, filed: Dec. 18, 2008.

"Architecture For Controlling Placement And Minimizing Distortion Of Images", by Conlon et al., U.S. patent application Ser. No. 12/614,715, filed: Nov. 9, 2009.

"Controlling Placement And Minimizing Distortion Of Images In An Imaging Device", by Conlon et al., U.S. patent application Ser. No. 12/614,673, filed: Nov. 9, 2009.

BRIEF SUMMARY

What is provided are a novel system and method, and computer program product for transforming graphics coordinates between different models of image processing systems. Using the present method, a user can readily configure their image processing system to receive image data from a device platen in a first coordinate space and map the received data to a second coordinate space for subsequent processing independent of whether the two coordinate spaces share the same or differing origins. An implementation hereof enables a user to configure their image processing system to transform image data to any desired processing orientation. The present frame-based coordinate transformation method allows key operators to standardize all their multifunction devices to receive image data using, for example, an upper-left registration orientation. A GUI enables users to select corner, center, or an arbitrary point for their orientations, or for an administrator or key operator to set policies for orientation behaviors for multifunction devices in their respective fleets.

In one example embodiment, graphic image data is received by a first model MDF in a first coordinate space. The first coordinate space has a first distinct origin and a first orientation of coordinate axes. The received image data is to be mapped to a second model MDF with a second coordinate space having a second distinct origin and a second orientation of coordinate axes. A first selection is made, based on a set of relative coordinate space mappings, to select at least a first transformation for mapping of the image data in the first coordinate space to an intermediate image canonical coordinate space, wherein the intermediate image canonical coordinate space has coordinates which are independent of the image processing system. A second selection is made, based on the set of relative coordinate space mappings, to select at least a second transformation for mapping from the intermediate image canonical coordinate space to the second coordinate space. A transformation operation is performed upon the image data to transform data in the first coordinate space through the intermediate image canonical coordinate space to the second coordinate space using at least the first transformation and the second transformation. Various other embodiments have also been disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a system and method which enables users to configure their respective imaging devices to receive image data in a first coordinate space and map the received data to a second coordinate space for subsequent processing.

NON-LIMITING DEFINITIONS

A "canonical coordinate space" is a coordinate space that is independent of the coordinates from both a source image processing device or a target image processing device. For simplicity, an example of a canonical coordinate space used in the present method and system, has the origin offset set to zero, i.e., {0,0,0} on a 3D Cartesian coordinate system. The canonical coordinate space mapping uses a canonical matrix form which is functionally equivalent to the identity matrix. Although all the mathematical operations hereof are shown in 3D, it should be appreciated that these same mathematical operations are equally applicable to 2D which is the primary dimensionality for many document imaging system applications "Clipping" is the process of using a frame or clipping window generically as a bounding box on an image to produce an image that is trimmed or clipped to the shape of the bounding box. Clipping is also known and described in the arts as "cropping". For purposes herein the terms may be used interchangeably.

Figure 5:
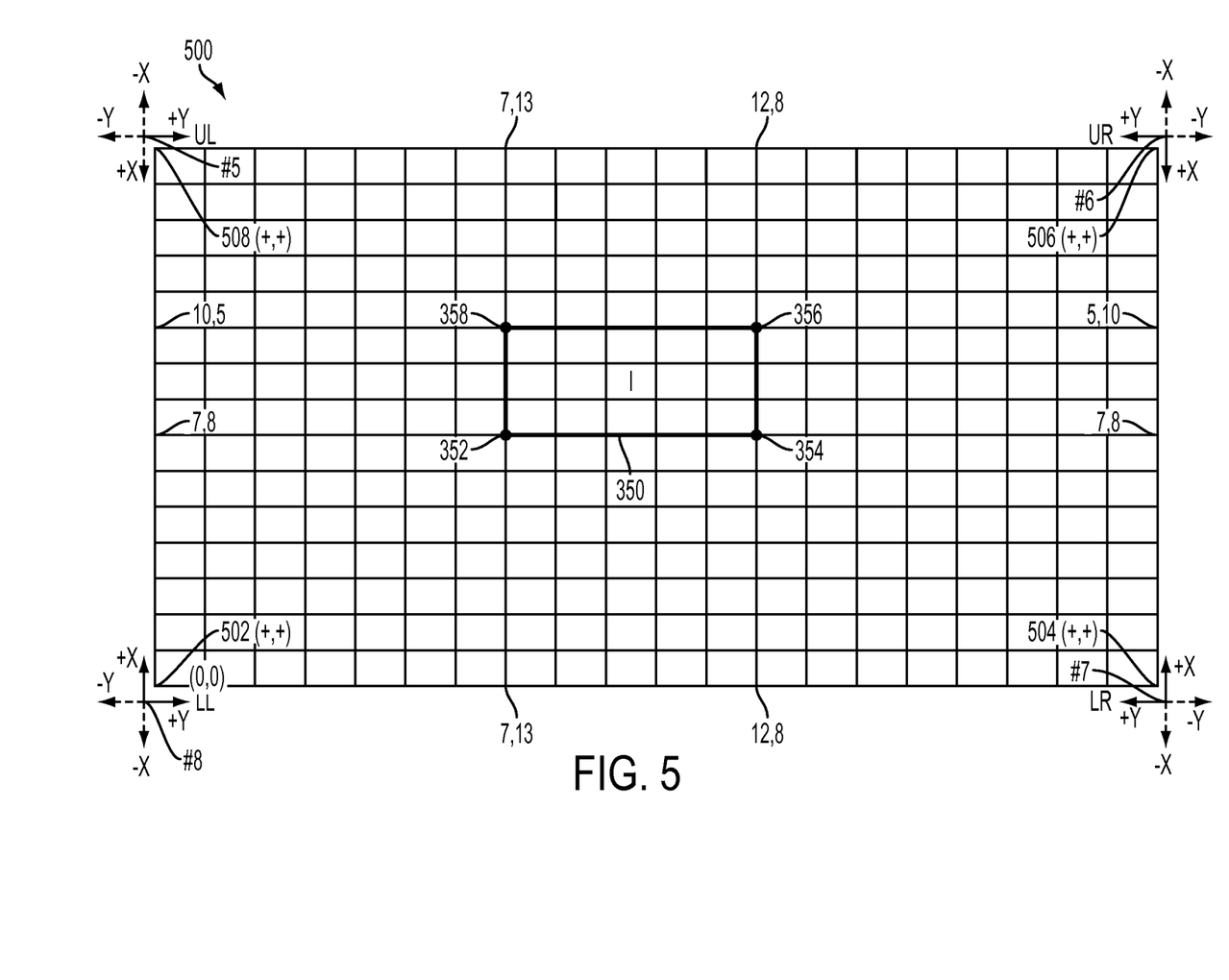

A "Coordinate Change Matrix" (CCM), also known as a "change of basis matrix", in the 2D context, is one of eight predefined matrix operations for a 2D coordinate space as shown in FIG. 5. Other predefined matrix operations may be used for a 3D coordinate space. It is important to note that the matrix in FIG. 5 are unscaled matrices, i.e., the origins are still based on a unit cube. Likewise for a 2D coordinate space, origins are based on a rectangular region such as a unit square. The translation is from a unit square to an actual corner. Therefore, this is a starting place but as will become evident herein further, the origin is changed to reflect the actual object corner locations relative to the original unit object (cube or square) origin. This creates a rectangular space where coordinates and functions may be mapped or changed.

A "coordinate space" refers to a 2D or 3D rectangular coordinate system, such as a standard Cartesian coordinate system. Each coordinate space has a unique origin where two or more of the axes intersect. The coordinate space is not limited to rectangular (orthogonal) coordinate systems.

A "device level transformation" is an operation, such as scaling, translation, mirroring or reflecting, and rotation, on image data typically not initiated by a user or customer but rather in response to handling differences between two image processing devices. For example, printing image data on a second device when the image data is setup for a first device. In this instance, it is often desirable to avoid printing edges because toner fouls the paper path. To avoid this, the image is scaled to 98% and centered when printing the image data on the second device. Device level transformations can be performed by itself or in conjunction with user-interface level transformations. Device level transformations can also be performed by in conjunction with device level transformations of other emulated devices.

"Emulation" is the process of imitating an order-of-operation specific behavior on a particular imaging system that enables it to do the same work, run the same production jobs/tickets, as another imaging system. The process of emulation can be carried out in software, and/or hardware or a special purpose computer processing system configured to perform emulation as defined herein.

A "source background frame object" is an instance of a frame as applied to a source background object. The source background object may correspond to a region on an image, an imageable substrate, a scanner, a raster output system, or a paper path.

A "frame" or "clipping window" or "clipping region" are used generically to refer to a bounding box (2D) or bounding region (3D). A 2D frame includes, but is not limited to, an area of a rectangular sheet or simply an image. A 3-D frame is a volume. The frame can be any geometric shape, although frames are typically rectangular. A frame is a general concept that can be consistently applied to a variety of situations in document imaging systems. One corner of a frame is typically anchored to an origin. For example, a positive value in a first quadrant is typically referenced with rectangular coordinates. A source background frame object such as a rectangular region is an instance of a frame. The source background frame object is also referred to as a canvas in an imaging context. The source background object may correspond to a region on an image, an imageable substrate, a scanner, and a raster output system. It should be appreciated that the techniques in the present method and system are readily extendable to 3D space. In the 3D case, Z simply becomes non-zero and the use of a 3D affine form (i.e., a homogeneous form) for the data points is possible. Common examples would include the orientation of a device or sheet which would have either a face up or face down physical orientation. Likewise, image, paper, or device paths may have a Z-axis orientation component.

A "forward coordinate change mapping" is where the set of points $P_S$ is associated with the source vector space S and the set of points $P_T$ is associated with the target vector space T. Within-device or within-UI mappings for operations such as rotation, scaling, translation and reflection are relative to the particular device coordinate spaces (mappings are within-space). During emulation, mappings must be done between differing devices or UIs. Mapping in this case are across-spaces, which require coordinate change mappings from a source space to a target space.

An "inverse (or 'backward') coordinate change mapping" is where the set of points $P_S$ is associated with the source vector space S and the set of points $P_T$ is associated with the target vector space T. There is still abstractly a mapping between a source vector space to a target vector space, but the order of mapping or relation is reversed because the spaces are reversed. As above, the coordinate change mapping is across-spaces. Note that such mappings also apply to functions, and the technique is more generally called change of basis.

"Order-of-Operation" (OOO) refers to transformation operations such as scaling, translation, reflecting, and/or rotation which are non-commutative, that is, changing the order of each transformation in a set of transformations changes the results and behaviors.

"Target coordinate space" is a coordinate space to which the set of source objects (foreground/background frame objects, coordinates, offsets, clipping windows, etc.) are to be mapped. It reflects the coordinate space in a target UI and/or device. In this application all coordinate spaces are frame-based coordinate spaces.

A "transformation operation" or "transform" as used herein refers to a mathematical operation to map within a coordinate space and/or between distinct coordinate spaces. Specific transformation are scaling, translation, reflecting, and rotation. In one embodiment, the transformation operation itself is the matrix multiplication of one or more of the preselected Coordinate Change Matrices applied to the matrix of image data, converted either to or from an intermediate canonical coordinate space. The transformation can use forward or inverse predefined Coordinate Change Matrices.

"User Interface (UI) Level Transformation" is an operation performed by an operator or user through a user interface. Such operations include, for instance, scaling, translation, reflecting, and rotation, on image data. For example, a user wants to scale the image by 50% or may be 150% overall. Another example might be scale-to-paper-size in response to a user selection. A UI Level Transformation can be performed by itself or in conjunction with device level transformations. It should be appreciated that the teachings hereof can be decoupled of any UI-level and device level operations. Today device level behavior typically dictates the UI-level behavior, resulting in an inflexible and inconsistent customer experience at the fleet level.

An "image", as used herein, refers to a spatial pattern of physical light comprised of known colors of the light spectrum which are visible by the human eye. When reduced to capture or rendering, the image generally comprises a plurality of colored pixels. A printed image (or image print) would be a photograph, plot, chart, and the like, as are generally known. When an image is rendered to a memory or storage, the values of the color pixels are generally stored in any of a variety of known formats such as, for example, BMP, JPEG, GIF, TIFF, or other formats employed for storing image data on a storage media for subsequent retrieval. Received pixels of an input image are associated with a color value defined in terms of a color space, comprising typically 3 color coordinates or axes.

An "imaging device" is any device with at least one of an image input device or an image output device or both. The set of image output devices includes xerographic reproduction systems, multifunction devices, monitors and other displays, image processors (including Graphics Processing Units or GPU), computer workstations and servers, and the like.

An "image input device" is any device capable of capturing image data as an image capture device and/or for reproduction and display of an image as an image output device. The collection of image output devices includes xerographic systems, multifunction devices, monitors and other displays, image processors (including Graphics Processing Units or GPU), computer workstations and servers, and the like. Image output devices receive a signal of an image and reduce that signal to a viewable form.

An "image output device" is any device capable of receiving a signal of an image and rendering that image to a viewable form.

An "imageable substrate" is a substrate such as paper, film, cardstock, photographic paper, Mylar, and other printable surfaces, upon which an image can be marked or printed.

High-Level Flow

Figure 2:
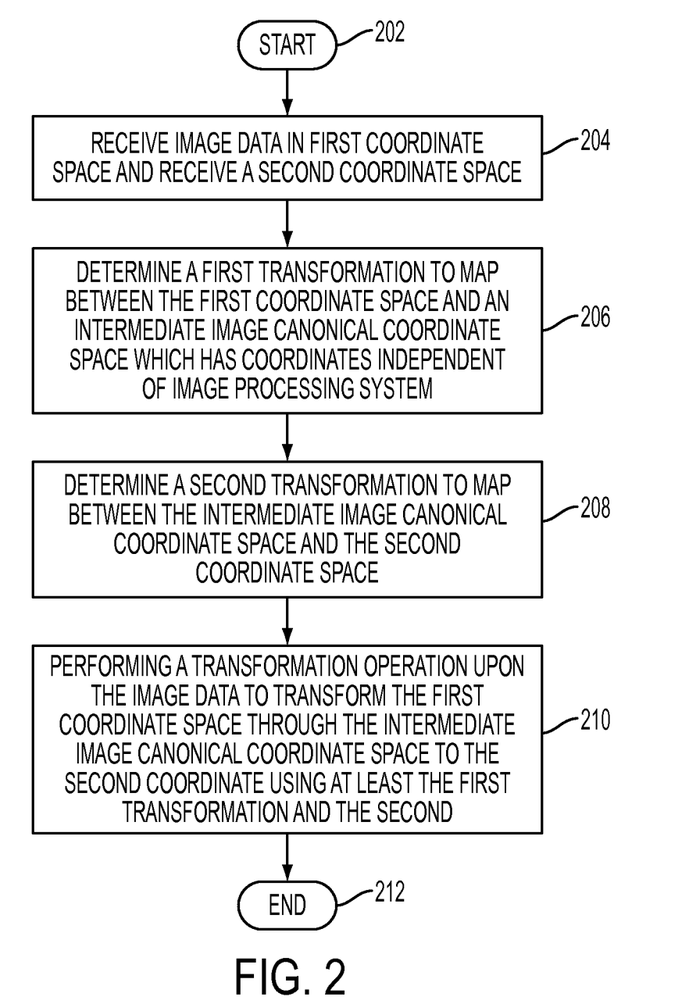
FIG. 2 is a flow diagram of one example embodiment of the present method.

FIG. 2 shows a high-level flow diagram of the over all method for transforming coordinates in an image processing system, such as the coordinates with origin 104 from Model A 102 MFD to coordinates with origin 154 on Model B 152 MFD. The method begins at step 202 and immediately proceeds to step 204, where image data is received in a first coordinate space, such as from Model A 102 MFD and second coordinate space information is received such as from MODEL B 152 MFD.

At step 206, a first selection or determination is made, based on a set of relative coordinate space mappings, to select at least a first transformation for mapping of the image data in the first coordinate space to an intermediate image canonical coordinate space, wherein the intermediate image canonical coordinate space has coordinates, which are logically independent of the image processing system.

At step 208, a second selection or determination is made, based on the set of relative coordinate space mappings, to select at least a second transformation for mapping from the intermediate image canonical coordinate space to the second coordinate space.

At step 210, a transformation operation is performed upon the image data to transform the first coordinate space through the intermediate image canonical coordinate space to the second coordinate space using at least the first transformation and the second transformation. It is important to note that the transformation operation in one embodiment is a composite matrix operation of at least the combination of the first composite matrix and the second composite matrix. In another embodiment, the transformation consists of two steps (not shown). A first transformation operation from the image data in the first coordinate space using the first coordinate change matrix to the intermediate image canonical space. Followed by a second transformation operation of the image data from the intermediate image canonical space to the second coordinate space. Finally, the process ends in step 212.

Also, as described in greater detail with reference to FIG. 5, the first transformation is an inverse change transformation matrix and the second transformation is a forward change transformation matrix from the group of eight matrices shown. It is important to note that these are invertible matrices and only the forward transforms are provided, at times the inverse of the matrices must be used.

General Overview of Frame-Based Coordinate Systems

An overview of Cartesian coordinate systems is found online at the URL (http://en.wikipedia.org/wiki/Cartesian_coordinate). The axes in the coordinate space go on forever in each direction, and with 4 quadrants, all but the first has negative values ({+,+}, {−,+}, {−,−}, {+,−}). Mapping between different Cartesian coordinate spaces is known and described in many linear algebra books. When it comes to describing the coordinates of an image, sheet or device, a corner is selected as the origin. The coordinates in the frame are typically described in positive values, i.e., within the frame, the default, regardless of the corner chosen, is essentially equivalent to the first quadrant ({+, +}). Note that, of the 8 possible axes orientations there is only one standard coordinate space—the canonical space, by our definition, that is consistent with the common Cartesian coordinate space. All other relative corners and axis directions create non-standard coordinate spaces relative to canonical. In this context, axes have been reflected relative to corner origins offset from canonical. It is important to note that negative values are possible in applications where the frame coordinate spaces go on indefinitely. For example, it is possible for a clipping window to go out of bounds and have some negative coordinates by going off an image, sheet, or device frame.

Figure 3:
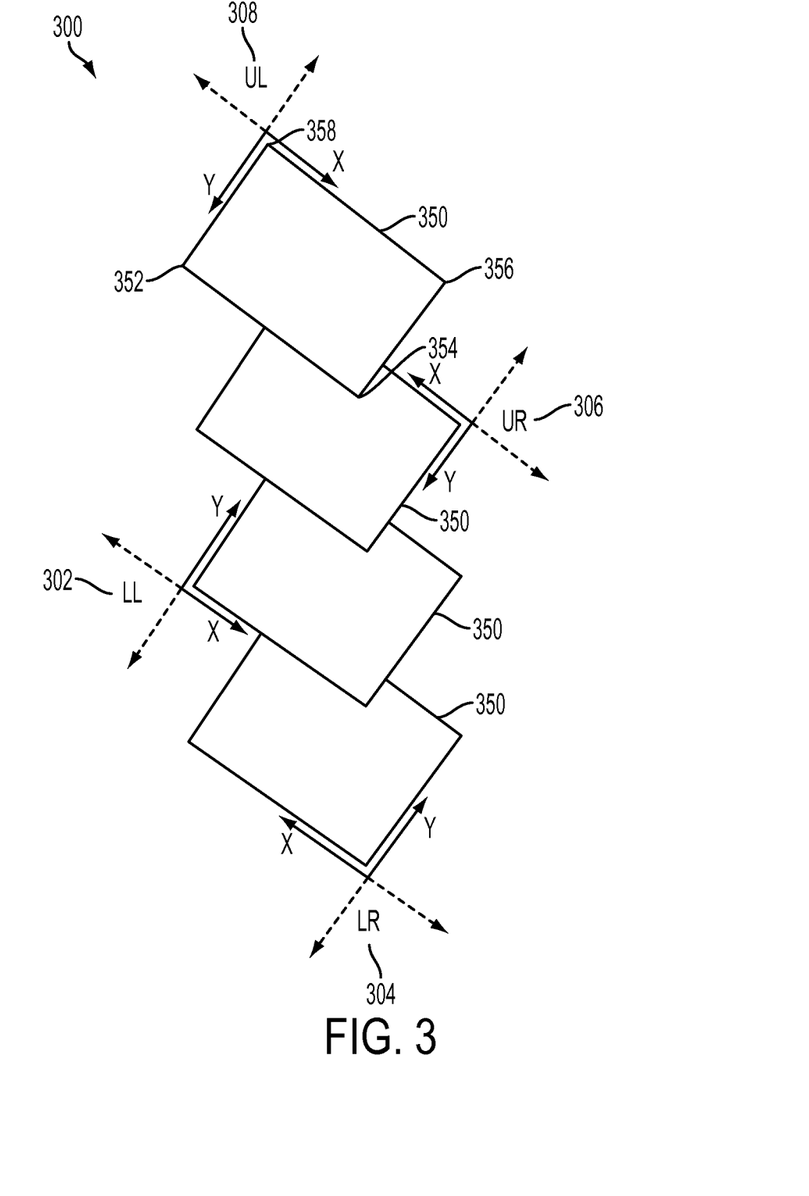
FIG. 3 is an example of an exploded view of four different origins of a given 2D coordinate space for a set of axes X and Y.

Reference is now being made to FIG. 3 which is an example of an exploded view of four different origins in a given 2D coordinate space for a set of axes X and Y. The corners are denoted as lower-left (LL) 302, lower-right (LR) 304, upper right (UR) 306, and upper-left (UL) 308. For the 2D frame case, with 4 axes and 2 permutations per axes where the first quadrant ({+,+}) axes are oriented towards the frame. For simplicity, these orientations are used in a consistent manner with reference to the remaining figures.

Figure 4:
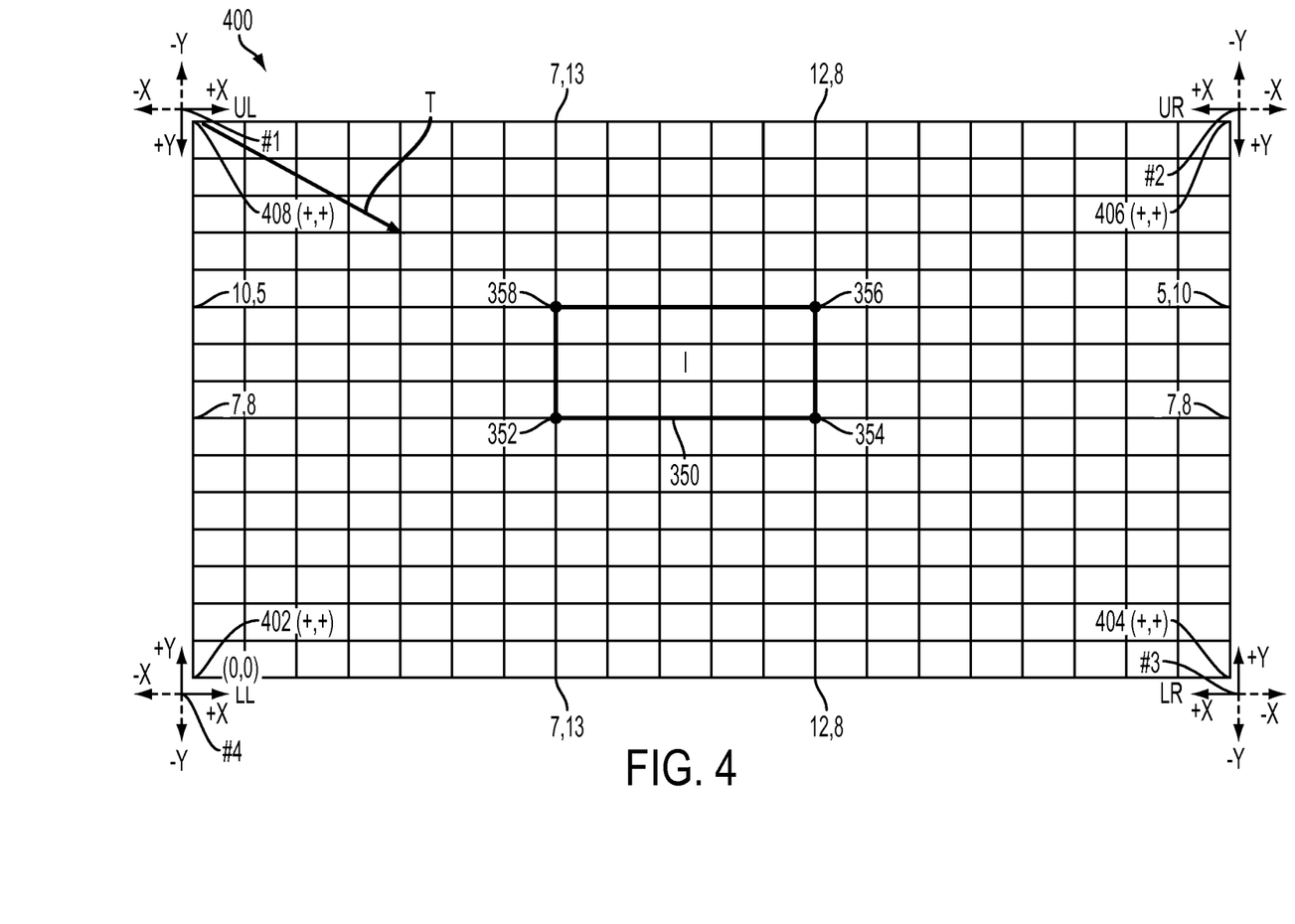
FIGS. 4 and 5 are graphs of an example image frame with a clipping window wherein all eight rectangular coordinates spaces as used.

Turning now to FIGS. 4 and 5. In FIG. 4, shown is a first 2D frame 400 with 4 corners denoted as origins lower-left 402, lower-right 404, upper-right 406, and upper-left 408. In FIG. 5, shown is a second 2D frame 500 with 4 corners denoted as origins lower-left 502, lower-right 504, upper-right 506, and upper-left 508. For the 2D frame case, with 4 axes and 2 permutations per axes where the first quadrant ({+,+}) axes are oriented towards the frame, there are 8 different coordinate spaces for a frame as shown across FIG. 4 and FIG. 5. FIG. 4 has X/Y axes going in a way a user might typically think about X/Y from Cartesian directions (X-axis horizontally, Y-axis vertically). In one embodiment the coordinate spaces in FIG. 4 on the screen as the defaults and the user is able to select the FIG. 5 spaces as an alternative. Note that these other axes permutations are possible but are typically less relevant to image/document processing systems.

FIG. 5 is a table of Coordinate Change Matrices (CCM) used for mapping from a first coordinate space to a second coordinate space. For convenience, both figure and item numbers are shown in the first two columns. For example, row 1 denotes 2D (two dimensional) frame 500 with corner lower-left 502. Both the 2D and 3D (three dimensional) Coordinate Change Matrix are shown.

Figure 6:
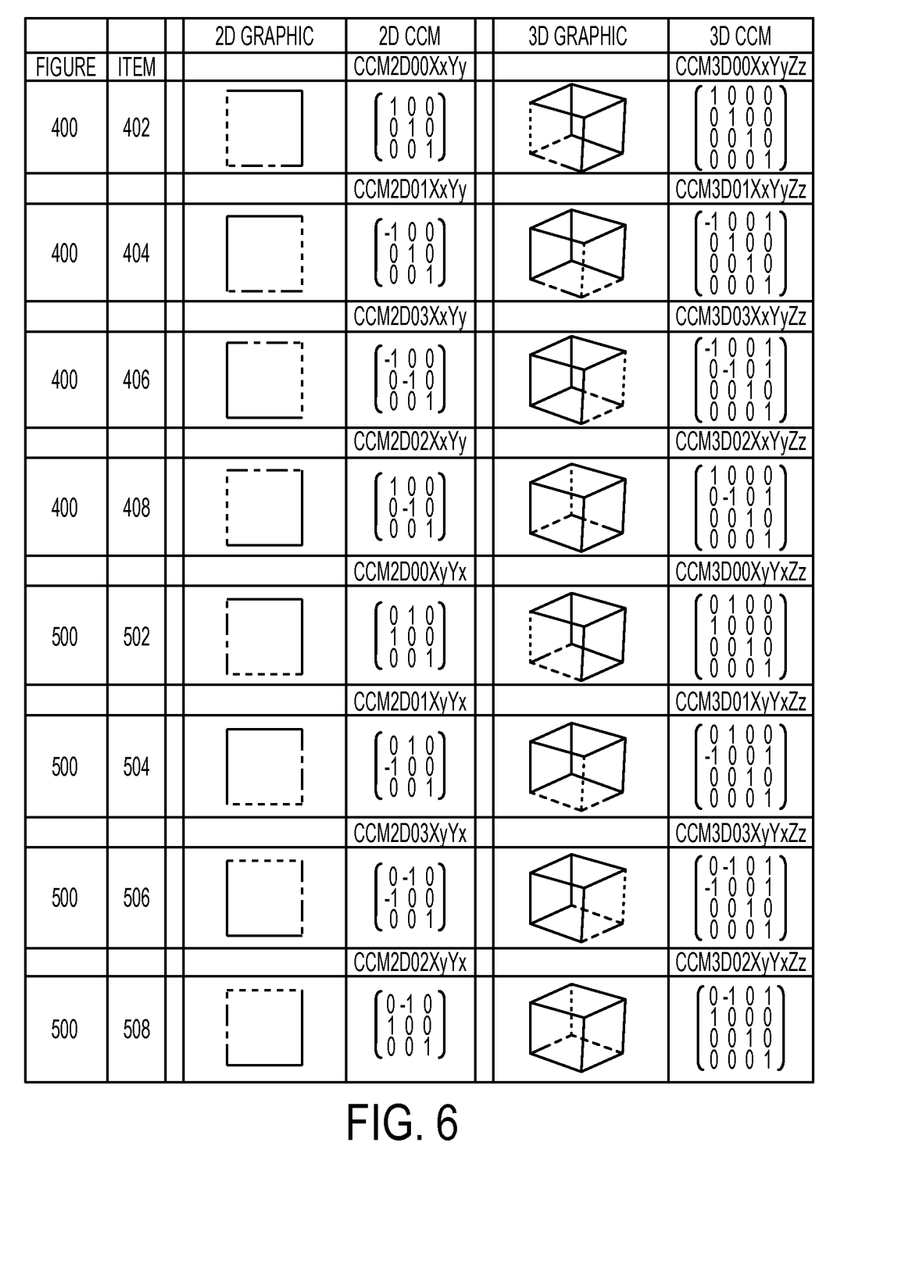
FIG. 6 is a table of Coordinate Change Matrices (CCM) used for mapping from a first coordinate space to a second coordinate space.

Once the correct Coordinate Change Matrices (CCM) have been selected from FIG. 6 and special scaled to cover the shape of the object, based on the source object dimensions and coordinate spaces, then apply a linear algebra change of basis using these special orthogonal orientation matrices map between the source and target spaces. The linear algebra has been simplified by the creation of these predefined Coordinate Change Matrices in FIG. 6. After the image data is received in a first coordinate space, a determination is made of which type of transformation has be made in order to map the data in the first coordinate space to the intermediate image coordinate space. The technique is known as change of basis (or, coordinate change). What is unique to here is that coordinate spaces are orthogonal and axis-aligned where mappings are based on a computational framework that formally describes such spaces. The coordinate/orientation matrices created by the inventor as shown in FIG. 6 are used to map from each corner. For simplicity, the coordinate space for each source is mapped to corner 402, i.e. {0,0} in the I$^{st}$ quadrant in the frame 400, as part of mapping to the canonical coordinate space. This is for simplicity only and it is possible to map any other corners as well in the same way. If the dimensions of the source and target frame are different, the origins must be translated as well based on the dimensions of the frame. For example, an 8.5" (height)×11" (width) landscape frame will have corner coordinates of ({0,0}, {11,0}, {0,8.5}, {8.5,11}). The orientation matrix=CCM=change matrix must be "scaled" (resized appropriately). This scaling operation changes the origins by changing the translation offset. It can be envisioned as stretching a unit cube to the particular dimensions of a given frame. For further information on expanding a 2D frame to a 3D space, refer to the above-incorporated reference entitled: "Frame-Based Coordinate Space Transformations Of Graphical Image Data In An Image Processing System".

Once the correct coordinate change matrices have been selected from FIG. 6 and scaled, based on the source and destination, then linear algebra change of basis using these special orthogonal orientation matrices is used to map between the source and destination spaces. The linear algebra has been simplified by the creation of these predefined coordinate change matrices in FIG. 6. A special function to simplify modification of origin offset in the matrix relative to the canonical origin has been created.

As an example, suppose the source image in a first coordinate space is in corner 506 of FIG. 5, with X-axis downward and the Y-axis leftward. In order to map the coordinate space of the source image to an intermediate image canonical coordinate space (in this example corner 502 with origin {0, 0}, which is logically independent of the imaging device), then FIG. 6 Item 502 is selected and the Coordinate Change Matrix is found in the Coordinate Change Matrix table of FIG. 6. Stated differently, the following entry from the table of FIG. 6 is selected to mathematically map the image data from the source coordinate space to the intermediate image canonical coordinate space. Since these are invertible matrices and only the forward transforms are provided, in this example the inverse of the matrices must be used. Therefore, after a mapping from canonical space is selected, the matrix inverse of the appropriate matrix is performed to map back to canonical space.

Continuing with this example, if the target coordinate space is corner 508 of the frame with X-axis running rightward and the Y-axis running downward, then the corresponding matrix of Item 508 of FIG. 6 is selected to map the image date from the intermediate canonical coordinate space to the desired target coordinate space.

It should be understood that using the combination of coordinate change matrices in FIG. 6, along with an intermediate canonical coordinate space with coordinates that are logically independent of the coordinate space of both the source and target spaces, the coordinates can easily be transformed between them.

Mathematica Example

The present method and system has been modeled using Mathematica by Wolfram Research, Inc. of Champaign, Ill. With respect to FIG. 4, the following abbreviations are being used for the four corners of frame 400 Lower Left (LL) 402, Lower Right (LR) 404, Upper Left (UP) 408, Upper Right (UR) 406. Again, for each origin and axes direction there is a corresponding coordinate change matrix in FIG. 6. In this example, the canonical coordinate space has been selected to be the LL 402. The canonical coordinate space serves as the intermediate mapping between two coordinate spaces (including the embodiment where one of the spaces is the same as canonical). Using this intermediate image canonical coordinate space, image data is mapped from one "source" space to canonical, then from canonical to another "target" space. In an embodiment, the full composite transform is performed using matrix algebra, in the final mapping between spaces. The present method and system extends that use of composite transform from graphics image space (e.g. Microsoft Office and OpenGL, where each axis continues to infinity) to frame-based X-Y coordinate systems used by image processing systems (e.g., scanners, MFDs, copiers with predefined bounds or limits on each axis) with the various coordinate systems shown in FIGS. 3 and 4.

Next, on the graph notice a rectangular box 350. In this example, rectangular box 350 is a clipping region, where only the region inside the box is kept and the rest of the region discarded. The terms clip and crop are used interchangeably in this example. Alternatively, the box could represent, for example, an image imposed on a sheet, or the positioning of a sheet on a mechanical or xerographic device. Note also the translation vector T anchored in the UL 408 corner of frame 400. This is for image shift. It is represented by a magnitude and direction. We wish to show how the translation vector in a source space may be represented in a different target space. As with mapping a clipping window 350, the translation vector T has the head and tail mapped from particular origin of a first coordinate space to another origin of a second coordinate space. Using vector mathematics the origin is subtracted off the origin of the translation vector T resulting in a new vector that logically "moves" the translation to the new origin. Further, since shifting or translating is from an origin, it is helpful to focus on the head (arrow side) value of vector T as a point that may be mapped to a different vector space. The following is an example to clarify this translation.

The rectangular box 350 is measured from using four origins of four rectangular coordinate systems (#1 UL, #2 UR, #3 LR and #4 LL) shown on frame 300. Recall there are actually four possible origins of eight possible rectangular coordinate systems where the X-axis and the Y-axis are swapped where the 1$^{st}$ quadrant is facing into the frame. First, a measurement is made from each of the origins of each of the four rectangular coordinate systems #1 UL, #2 UR, #3 LR and #4 LL. It is important to note that points for LowerLeftRectangle, LowerRightRectangle, UpperLeftRectangle are relative to each corner 402, 404, 406 and 408 of frame 400 and space and UpperRightRectangle is relative to corner 506 of frame 500 in FIG. 5. The following points are obtained.

In[159]:=UpperRightRectangle={{5,8,0,1},{5,13,0,1}, {8,8,0,1},{8,13,0,1}}
Out[159]={{5,8,0,1},{5,13,0,1},{8,8,0,1},{8,13,0,1}}
In[160]:=LowerLeftRectangle={{7,7,0,1},{12,7,0,1},{7, 10,0,1},{12,10,0,1}}
Out[160]={{7,7,0,1},{12,7,0,1},{7,10,0,1},{12,10,0,1}}
In[161]:=LowerRightRectangle={{8,7,0,1},{13,7,0,1}, {8,10,0,1},{13,10,0,1}}
Out[161]={{8,7,0,1},{13,7,0,1},{8,10,0,1},{13,10,0,1}}
In[162]:=UpperLeftRectangle={{7,5,0,1},{12,5,0,1},{7, 8,0,1},{12,8,0,1}}
Out[162]={{7,5,0,1},{12,5,0,1},{7,8,0,1},{12,8,0,1}}

Again, naming conventions are not important rather, it is important to describe the rectangle coordinates from an origin. For example, UpperRightRectangle means origin is in Upper Right 356 of rectangle 350 on FIG. 4 and distance to points is relative to this origin. Further, the points are in affine/homogeneous form matrix for 3D. Meaning, {x,y,z, 1}. In this case, 3D matrices are used in to represent 2D regions, hence Z is always zero. Note that simplified 2D representations (no Z component) are an obvious alternative useful for many applications giving the same 2D results. The "1" at the end is standard for affine matrix math. The UpperRightRectangle is {{5,8}, {5,13}, {8,8}, {8,13}}. Recall that UR is an example of swapping axes. Keep this in mind as a count for each axis is performed.

Turning now to FIG. 6, shown are eight coordinate change matrices created to represent each of two frames shown in FIGS. 4 and 5, where each frame has four origins. Matrices as shown map from canonical space to a given desired coordinate space. These are repeated across both FIG. 8 origins of four rectangular coordinate systems.

To keep things simple, four orientation matrices are selected as follows:

| | | |
|---|---|---|
| Lower Left Item 402 | CCM3D00XxYyZz | Canonical space, same as Cartesian. Note that it is the identity matrix. Therefore any transform using the identity matrix leaves the points as they were. There is an ordering convention to cube vertices (and it is lexicographic). LL = 00. |
| Lower Right Item 404 | CCM3D01XxYyZz | X, Y, Z are the canonical directions. This has a reflected X-axis, but the general axis directions are the same. The last part of the name is a convention for permuting axes I invented. LR = 01. |
| Upper Left Item 308 | CCM3D02XxYyZz | UL = 02. Note in the first 3 cases axes are in standard location. The next presents x vertically, and y horizontally. |
| Upper Right Item 406 | CCM3D03XyYxZz | Note that Xy means y maps along the canonical X direction. Yx means x maps along the canonical Y direction. For completeness, and given we don't care about 3D matrix representation of 2D space, Zz means the Z direction is left alone. Of course, in the context of mixing this with a 3D paper path and image path, Z would be included within the true scope and spirit of the present method and system. Positive Z is face up, negative Z is face down. |

Now we have the corners picked out, the coordinate values of the rectangle relative to each corner, and orientation matrices need have been selected based on the coordinate space for each corner of the rectangular box 350. The matrices act as mappings or functions between coordinate spaces from canonical (LL). Next we need to modify or "scale" the CCM matrices so that the origin offsets reflect the dimensions of the frame. The original unmodified matrices have origins with unit offsets. This operation can be viewed as "scaling" the unit square (2D) or cube (3D) to the size of the particular frame or bounding region. The frame dimensions, in {X,Y} order, {20, 15}. Meaning, count the squares in each direction. Again, chosen to make things simple by using whole numbers, and it is important to note that fractions or decimal parts in measurements of inches or mm or other units are within the true scope and spirit of the present method and system.

The following uses a special function to scale the CCM to account for actual origin locations:
In[165]:=CCM3DLowerRight=scaleCCM3D [CCM3D01XxYyZz,{20,0,0}]
Out[165]={{−1,0,0,20},{0,1,0,0},{0,0,1,0},{0,0,1}}
In[179]:=CCM3DUPPERLEFT=scaleCCM3D [CCM3D02XxYyZz,{0,15,0}]
Out[179]={{1,0,0,0},{0,−1,0,15},{0,0,1,0},{0,0,0,1}}
In[189]:=CCM3DUpperRight=scaleCCM3D [CCM3D03XxYyZz,{15,10,01}]
Out[189]={{0,−1,0,15},{−1,0,0,20},{0,0,1,0},{0,0,0,1}}

Two observations to note. First is that the LL matrix does not need to be scaled because in the intermediate image canonical coordinate space has it origin at {0,0}. For technical completeness the LL matrix could be scaled, but mathematically the same matrix would result and that would be an extraneous operation. Second comment is that since the UR axes are swapped, the scaling values need to be swapped. Note that it is {15,20,0}. The zero isn't really used but it is left there for consistency to include the Z axis, and simply zero it out.

These matrices are mappings from canonical or "source" space, to a non-canonical "target" space. The direction is important; as shown below that the mapping from target to source space is a forward operation. It is important to note that canonical can be a source space, or target, but typically it is thought of as an intermediate space. So for example, given some remote source space, you want to get to some other remote target space. Stated differently, the inverse of a coordinate change matrix in the group of eight matrices shown in FIG. 6 is used to transform from the source coordinate space to the intermediate canonical space and a forward coordinate change matrix in the group of eight matrices shown is FIG. 6 is used to transform from the canonical space to the target space. These coordinate change matrices in one embodiment are combined into a composite change matrix. The following is an example of one of the special function to scale the CCM for UpperRight in matrix format:
In[168]:=CCM3DUpperRight//MatrixForm
Out[168]/MatrixForm=

$$\begin{pmatrix} 0 & -1 & 0 & 20 \\ -1 & 0 & 0 & 15 \\ 0 & 0 & 1 & 0 \\ 0 & 0 & 0 & 1 \end{pmatrix}$$

The first 3 columns are for mapping {x,y,z,1}, and the last column is for translation. Now, normally {x,y,z,1} values go down the main diagonal (UL→LR). That the first two columns have X and Y position swapped is due to the permutation. That the values are negative is due to reflecting the axes (go in opposite directions). That the Z is in a unit value of 1 means the Z value will remain unchanged after mapping, so nothing changes in the 2D transformation. The unit value means that during matrix multiplication, the direction may change, and shifting to change the origin may occur, but the absolute value of points by unit multiplication is not changed. And again, the subtlety with this example is that since the axes are swapped, the origin offsets from canonical need to be swapped for special scaling. Similarly, the other matrices in this example have origin offset values. The origin values are not swapped, although either X or Y translation values might be zero if that is the offset from canonical.

Using linear algebra the following mappings between 3 coordinate spaces can be performed. Begin with a canonical space as LL (can be any of the overlapping rectangular coordinate spaces, but typically it is the standard Cartesian origin and space). Next, in this example, there is a need to map from LR→UL. From the table above, the mappings from canonical or source to a target spaces is as follows:
LL→LR is CCM3D01XxYyZz and LL→UL is CCM3D02XxYyZz.

Mapping the opposite direction is done with inversing the mappings which are matrices. So:
LR→LL is CCM3D01XxYyZz$^{-1}$ and UL→LL is CCM3D02XxYyZz$^{-1}$ Using linear algebra, the mapping from LR→UL is found by using the inverse map from LR→LL, then forward map LL→UL. In Mathematica example, the inverse matrix M is implemented with via the Inverse[ ] function, as in Inverse [M]. This set of mappings results in a final, composite matrix which describes the mapping between two non-canonical spaces. In Mathematica, composition is done via matrix multiplication, and is represented by the "." (dot) operator. Further, matrix multiplication in this software program is performed right to left.

In a more complete example, the modified or scaled matrices show above must be used. Therefore our mapping with these matrices using the above example (LR→UL) would be as follows:
LR2ULCCM=CCM3DUpperLeft. Inverse [CCM3DLowerRight]
Out[180]={{−1,0,0, 20},{0, −1,0,15},{0,0,1,0},{0,0,0,1}}
In[193]: LR2ULCCM//MatrixForm
Out[193]//MatrixForm=

$$\begin{pmatrix} -1 & 0 & 0 & 20 \\ 0 & -1 & 0 & 15 \\ 0 & 0 & 1 & 0 \\ 0 & 0 & 0 & 1 \end{pmatrix}$$

This is a transform that can map points in the LR space to their equivalent in the UR space. Note the right to left processing and matrix multiplication. Now the values for the rectangle as viewed in the lower right (LR) are used and mapped to the upper right. Due to this particular ordering of matrix operation our points are put in column form via a Transpose[ ] function. So the points are {x,y,z,1} in homogeneous form, are vertically oriented. Note that other matrix/data representations are possible and common (e.g., points are represented in rows and the order of matrix operations are reversed to give equivalent results). The first column, {12,8, 0,1}, should be viewed in terms of ignoring the final 1 as needed for affine operations, and the zero, which is the Z coordinate that we ignore because we are working in 2D. In other words, it is in typical 2D form as {12,8}. The ordering is different than the original ordering, but that is trivial to reorder as desired. This is standardized as follows:

In[184]:=LR2ULCCM Transpose [LowerRightRectangle]//MatrixForm

Out[184]//MatrixForm=

$$\begin{pmatrix} 12 & 7 & 12 & 7 \\ 8 & 8 & 5 & 5 \\ 0 & 0 & 0 & 0 \\ 1 & 1 & 1 & 1 \end{pmatrix}$$

By looking at the values for UpperLeftRectangle and viewing the data in column form, a successful mapping from LR→UL has been shown.

In[195]:=Transpose [UpperLeftRectangle]//MatrixForm

Out[195]//MatrixForm $$\begin{pmatrix} 7 & 12 & 7 & 12 \\ 5 & 5 & 8 & 8 \\ 0 & 0 & 0 & 0 \\ 1 & 1 & 1 & 1 \end{pmatrix}$$

Consider another example which would be common for image processing devices where one MFD or image processing system uses the UL as the origin, and another uses the UR. The transform would be UL→UR. The transform is UL2URCCM, using the input:

In[190]: U12URCCM=CCM3DUpperRight. Inverse [CCM3DUpperLeft]

Out[190]={{0.1.0.0},{−1,0,0, 20},{0,0,1,0},{0,0,0,1}}

In[191]: UL2URCCM Transpose[UpperLeftRectangle]//MatrixForm

Out[191]//MatrixForm=

$$\begin{pmatrix} 5 & 5 & 8 & 8 \\ 13 & 8 & 13 & 8 \\ 0 & 0 & 0 & 0 \\ 1 & 1 & 1 & 1 \end{pmatrix}$$

Now compare to UpperRightRectangle coordinate values:

In[196]:=Transpose [UpperRightRectangle]//Matrixform

Out[196]//MatrixForm $$\begin{pmatrix} 5 & 5 & 8 & 8 \\ 8 & 13 & 8 & 13 \\ 0 & 0 & 0 & 0 \\ 1 & 1 & 1 & 1 \end{pmatrix}$$

To clarify this operation further, it is broken down into individual steps. Using the first example, recall that LR→UL is LR$^{-1}$ LL→UL. Examining what the inverse operation does to the LR forward transform:

In[197]:=Inverse[CCM3DLowerRight]//MatrixForm

Out[197]:=//MatrixForm=

$$\begin{pmatrix} -1 & 0 & 0 & 20 \\ 0 & 1 & 0 & 0 \\ 0 & 0 & 1 & 0 \\ 0 & 0 & 0 & 1 \end{pmatrix}$$

Now multiply the set of coordinates from the LowerRightRectangle to give us coordinates in canonical or LL space:

In[198]:=Inverse [CCM3DLowerRight]. Transpose[LowerRightRectangle]//MatrixForm

Out[198]//MatrixForm=

$$\begin{pmatrix} 12 & 7 & 12 & 7 \\ 7 & 7 & 10 & 10 \\ 0 & 0 & 0 & 0 \\ 1 & 1 & 1 & 1 \end{pmatrix}$$

Compare to LowerLeftRectangle:

In[199]:=Transpose[LowerLeftRectangle]//MatrixForm

Out[199]//MatrixForm=

$$\begin{pmatrix} 7 & 12 & 7 & 12 \\ 7 & 7 & 10 & 10 \\ 0 & 0 & 0 & 0 \\ 1 & 1 & 1 & 1 \end{pmatrix}$$

So this completes the inverse mapping from LR→LL space. Now forward map from LL→UL. Since it is a forward mapping no inverse is needed and the scaled matrix is used directly:

In[204]:=CCM3DUpperLeft. Inverse [CCM3DLowerRight] Transpose[LowerRightRectangle]//MastrixForm Out[204]//MatrixForm=

$$\begin{pmatrix} 12 & 7 & 12 & 7 \\ 8 & 8 & 5 & 5 \\ 0 & 0 & 0 & 0 \\ 1 & 1 & 1 & 1 \end{pmatrix}$$

This is obviously in agreement with UpperLeftRectangle coordinates as well as the composite transformation results using LR2ULCCM from above.

In[195]:=Transpose[UpperLeftRectangle]//MatrixForm

Out[195]//MatrixForm $$\begin{pmatrix} 7 & 12 & 7 & 12 \\ 5 & 5 & 8 & 8 \\ 0 & 0 & 0 & 0 \\ 1 & 1 & 1 & 1 \end{pmatrix}$$

The final example is around an image shift or translation vector T, defined on the grid. It is anchored to the UL origin and has values of {4, 2}. For simplification, the translation vector T is modeled by two points, namely the tail at origin {0,0}, and the head at point {4,2}. Points are relative to the UL left origin. As points they may be mapped as readily as the rectangle coordinates using the exact same transformation. By way of example let us determine what translation vector T will be in the canonical space.

Both points must be translated from UL space to LL or canonical space. As with other points, these points are represented as homogeneous coordinates:

In[205]: UpperLeftTtail={0,0,0,1}
Out[205]={0,0,0,1}
In[206]:=UpperLeftThead={4,2,0,1}
Out[206]={4,2,0,1}

Next these points are mapped into the canonical or LL space. That would involve an inverse mapping of the forward mapping CCM3DUpperLeft and matrix multiplication to achieve coordinate changes:

In[207]: LowerLeftTtail=Inverse [CCM3DUpperLeft].UpperLeftTtail
Out[207]={0,15,0,1}
In[208]:=LowerLeftThead=Inverse [CCM3DUpperLeft].UpperLeftThead
Out[208]={4,13,0,1}

These are the exact points from the LL perspective. Recall that a vector is a magnitude and direction. It turns out that when these points are converted back into vector form, then we can make an important observation: for frames, it does not matter from where we make the shift, on a conceptual level. To convert the points back into the correct vector form the LowerLeftTail value is subtracted off from both:

In[209]: LowerLeftTtail—LowerLeftTtail
Out[209]={0,0,0,0}
In[210]:=LowerLeftThead—LowerLeftTtail
Out[210]={4,−2,0,0}

Ignoring the fact that the 1 in the last position was subtracted off (it only exists to be enable affine matrix operations), the result of this subtraction is to zero out the tail. The tail is turned effectively a {0,0} origin in the new space, and the head {4,−2} becomes the desired translation. In this sense, translation values can be viewed as both a point and a vector, and through this approach, we can map translation (shift) into a different space. Note that this mapping was not compound. In a more typical and general case, the earlier approach discussed above would be followed for a rectangle to map to another space (e.g., from UL→UR, or UL→LR using a composite mapping).

The present method and system could be used for print imposition. That is, the printing of pages on a single sheet of paper in a particular order so that they come out in the correct sequence when cut and folded. Imposition is often referred to as 2-Up or 4-Up meaning or N-up meaning the number image pages printed on a single sheet. As example is printing on multiple self-adhesive address labels on a single sheet of paper with a laser printer. It is important to note that other printable substrates such a paper, photographic paper and plastic sheets are typically used in print imposition applications. Another embodiments of "imposition" is simply the low level imaging operation of placing an image on top of another image that may be used for other applications.

Other Variations

Figure 7:
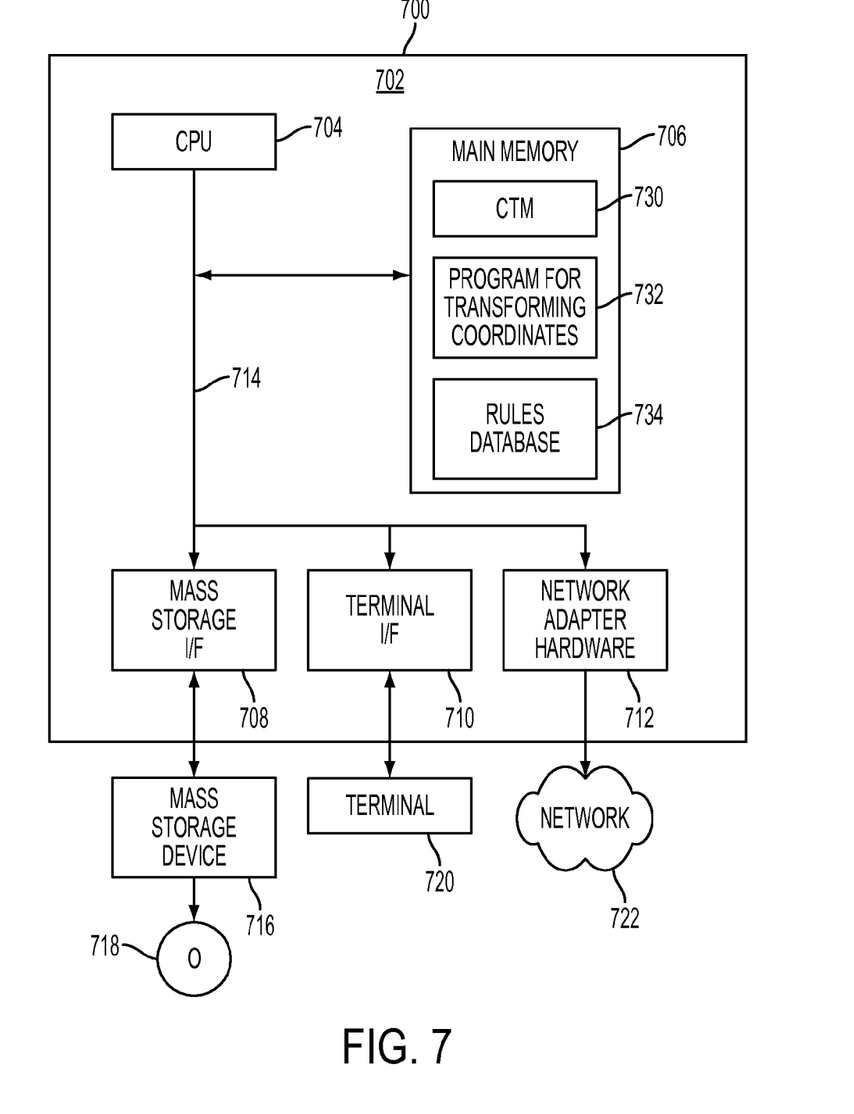
FIG. 7 is a block diagram illustrating a general purpose information processing system useful for implementing various aspects of the present method as described with respect to the flow diagram of FIG. 2.

FIG. 7 is a block diagram illustrating an information processing system that is useful for implementing embodiments of the present method and system. The information processing system 700 is a suitably configured processing system adapted to implement an embodiment of the present method and system. Any suitably configured processing system is able to be used, such as a personal computer, workstation, or the like.

This exemplary information processing system 700 includes a computer 702. The computer 702 has a processor 704 that is connected to a main memory 706, a mass storage interface 708, a terminal interface 710, and network adapter hardware 712. A system bus 714 interconnects these system components. The mass storage interface 708 is used to connect mass storage devices, such as data storage device 716, to the information processing system 700. One specific type of data storage device is a disk drive that can store data to and read data from a computer readable storage medium, such as an optical disk 718 or a magnetic disk. The main memory 706, which can be volatile and/or non-volatile memory, in this embodiment, includes, among other things, the CTM 730 of FIG. 5, a program for transforming the coordinates using the method in FIG. 2, enabled by CTM software, linear algebra libraries, computer graphics cards, graphics packages built-in to the OS (Windows, Mac, Java) or an industry standard like OpenGL or PDLs like Postscript. Also, can be used to map between representations inherent in these various technologies (eg, map from Windows graphics coordinate space to Postscript or Java). Mapping between ticket representations when there are different coordinate spaces.

All of these components can also be stored in a mass storage device 716. Although illustrated as concurrently resident in the main memory 706, such components are not required to be completely resident in the main memory 706, at all times or even at the same time. In this embodiment, the information processing system 700 utilizes conventional virtual addressing mechanisms to allow programs to behave as if they have access to a large, single storage entity, referred to as computer system memory, instead of access to multiple, smaller storage entities such as the main memory 706 and data storage device 716. The term "computer system memory" thus generically refers to the entire virtual memory of the information processing system 700. Although only one CPU 604 is illustrated for computer 702, computer systems with multiple CPUs can be used equally effectively. This embodiment of the present method and system further incorporates interfaces that each includes separate, fully programmed microprocessors or ASICS that are used to off-load processing from the CPU 704. Terminal interface 710 is used to directly connect one or more terminals 720 to computer 702 to provide a user interface to the computer 702. These terminals 720, which are able to be non-intelligent or fully programmable workstations, are used to allow system administrators and users to communicate with the information processing system 700. The terminal 720 is also able to be a user interface and peripheral devices that are connected to computer 702 and controlled by terminal interface hardware included in the terminal interface 710 that includes video adapters and interfaces for keyboards, pointing devices, and the like.

An operating system is included in the main memory, and is preferably a suitable multitasking operating system. However, further embodiments of the present method and system use any other suitable operating system. Some embodiments of the present method and system utilize an architecture, such as an object oriented framework mechanism, that allows instructions of the components of the operating system to be executed on any processor located within the information processing system 700. The network adapter hardware 712 is used to provide an interface to a network 722. Embodiments of the present method and system are able to be adapted to work with any data communications connections including present day analog and/or digital techniques, or a future networking mechanism.

It should be understood that the flow diagrams depicted herein are illustrative. One or more of the operations illustrated in any of the flow diagrams may be performed in a differing order. Other operations, for example, may be added, modified, enhanced, condensed, integrated, or consolidated. Variations thereof are envisioned and are intended to fall within the scope of the appended claims.

It should also be understood that the method described in the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system.

One or more aspects of the methods described herein are intended to be incorporated in an article of manufacture, including one or more computer program products, having computer usable or machine readable media. For purposes hereof, a computer usable or machine readable media containing machine readable instructions, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entity.

What is claimed is:

1. A method for transforming frame coordinates in an image processing system, the method comprising:

receiving image data in a first coordinate space and receiving a second coordinate space;

selecting, based on a set of relative coordinate space mappings, at least a first transformation for mapping of the image data in the first coordinate space to an intermediate image canonical coordinate space, wherein the intermediate image canonical coordinate space has coordinates which are logically independent of the image processing system, wherein the first transformation is an inverse change transformation matrix and wherein the selecting includes representing relative directions from the first coordinate space to the intermediate image canonical coordinate space using at least one of a group of coordinate mappings consisting of: i) rightward, downward, ii) leftward downward, iii) leftward, upward, iv) rightward, upward, v) downward, rightward, vi) downward, leftward, vii) upward leftward, and viii) upward, rightward, at least the first transformation;

selecting, based on the set of relative coordinate space mappings, at least a second transformation for mapping from the intermediate image canonical coordinate space to the second coordinate space, and wherein and the second transformation is a forward change transformation matrix and wherein the selecting includes representing relative directions from the intermediate image canonical coordinate space to a second coordinate space using at least one of a group of coordinate mappings consisting of: i) rightward, downward, ii) leftward downward, iii) leftward, upward, iv) rightward, upward, v) downward, rightward, vi) downward, leftward, vii) upward leftward, and viii) upward, rightward, at least the second transformation; and performing a transformation operation, using at least one processor and memory in the image processing system, upon the image data to transform the first coordinate space through the intermediate image canonical coordinate space to the second coordinate using at least the first transformation and the second transformation.

2. The method of claim 1, wherein the transformation operation upon the image data to transform the first coordinate space through the intermediate image canonical coordinate space to the second coordinate using at least the first transformation and the second transformation is a composite matrix transformation.

3. The method of claim 1, wherein the first coordinate space is a non-canonical space and the second coordinate space is a non-canonical space.

4. The method of claim 3, wherein the first coordinate space has a first distinct origin and first orientation of coordinate axes and the second coordinate space has a second distinct origin and a second orientation of coordinate axes.

5. The method of claim 4, wherein the at least one transformation operation is mapping data from the first coordinate space to the second coordinate space.

6. The method of claim 1, wherein the at least one transformation operation is a shift operation.

7. The method of claim 1, wherein the at least one transformation operation is a cropping/clipping operation.

8. The method of claim 1, wherein the at least one transformation operation is an imposition operation to place a plurality of printing of pages on a single sheet of printable substrate.

9. The method of claim 1, wherein at least one of the first coordinate space and the second coordinate space is a raster coordinate change matrix.

10. A system for transforming coordinates, the system comprising:
   a memory and storage medium for storing image data with a first coordinate space and information on a second coordinate space; and
   a processor in communication with said memory and said storage medium, said processor executing machine readable instructions for performing a method of:
   receiving image data in a first coordinate space and receiving a second coordinate space;
   selecting, based on a set of relative coordinate space mappings, at least a first transformation for mapping of the image data in the first coordinate space to an intermediate image canonical coordinate space, wherein the intermediate image canonical coordinate space has coordinates which are logically independent of the image processing system, wherein the first transformation is an inverse change transformation matrix and wherein the selecting includes representing relative directions from the first coordinate space to the intermediate image canonical coordinate space using at least one of a group of coordinate mappings consisting of: i) rightward, downward, ii) leftward downward, iii) leftward, upward, iv) rightward, upward, v) downward, rightward, vi) downward, leftward, vii) upward leftward, and viii) upward, rightward, at least the first transformation;
   selecting, based on the set of relative coordinate space mappings, at least a second transformation for mapping from the intermediate image canonical coordinate space to the second coordinate space, and wherein and the second transformation is a forward change transformation matrix and wherein the selecting includes representing relative directions from the intermediate image canonical coordinate space to a second coordinate space using at least one of a group of coordinate mappings consisting of: i) rightward, downward, ii) leftward downward, iii) leftward, upward, iv) rightward, upward, v) downward, rightward, vi) downward, leftward, vii) upward leftward, and viii) upward, rightward, at least the second transformation; and
   performing a transformation operation upon the image data to transform the first coordinate space through the intermediate image canonical coordinate space to the second coordinate using at least the first transformation and the second transformation.

11. The system of claim 10, wherein the transformation operation upon the image data to transform the first coordinate space through the intermediate image canonical coordinate space to the second coordinate using at least the first transformation and the second transformation is a composite matrix transformation.

12. The system of claim 10, wherein the first coordinate space is a non-canonical space and the second coordinate space is a non-canonical space.

13. The system of claim 11, wherein the first coordinate space has a first distinct origin and first orientation of coordinate axes and the second coordinate space has a second distinct origin and a second orientation of coordinate axes.

14. The system of claim 13, wherein the at least one transformation operation is mapping data from the first origin in the first coordinate space to the second origin in the second coordinate space.

15. The system of claim 11, wherein the at least one transformation operation is a shift operation.

16. The system of claim 10, wherein the at least one transformation operation is a cropping operation.

17. The system of claim 10, wherein at least one of the first coordinate space and the second coordinate space is a raster coordinate change matrix.

18. A computer implemented method for transforming imaging/graphics coordinates between different models of image processing systems, the computer-implemented method comprising:
   receiving graphics image data in a first coordinate space associated with a first model of image processing system;
   determining, based on a set of relative coordinate space mappings representing relative directions from the first coordinate space to an intermediate image canonical coordinate space using at least one of a group of coordinate mappings consisting of: i) rightward, downward, ii) leftward downward, iii) leftward, upward, iv) rightward, upward, v) downward, rightward, vi) downward, leftward, vii) upward leftward, and viii) upward, rightward to select at least a first coordinate transformation matrix for mapping of the image data in the first coordinate space to the intermediate image canonical coordinate space using at least a first coordinate change matrix, wherein the intermediate image canonical coordinate space has coordinates which are independent of the first image processing system;
   receiving a second coordinate space associated with a second model of image processing system;
   determining, based on the set of relative coordinate space mappings representing relative directions from the intermediate image canonical coordinate space to a second coordinate space using at least one of a group of coordinate mappings consisting of: i) rightward, downward, ii) leftward downward, iii) leftward, upward, iv) rightward, upward, v) downward, rightward, vi) downward, leftward, vii) upward leftward, and viii) upward, rightward to select at least a second coordinate transformation change matrix for mapping from the intermediate image canonical coordinate space to the second coordinate space using at least a second coordinate change matrix; and
   performing a transformation operation, using at least one processor and memory in the image processing system, upon the image data to transform the first coordinate space through the intermediate image canonical coordinate space to the second coordinate space using at least the first coordinate change matrix and the second coordinate change matrix.

* * * * *